US012728492B2

(12) United States Patent
Puchele et al.

(10) Patent No.: US 12,728,492 B2
(45) Date of Patent: Sep. 8, 2026

(54) DEVICE FOR MECHANICAL OVERLOAD PROTECTION AND PRODUCTION PROCESS FOR SAME

(71) Applicant: Hilti Aktiengesellschaft, Schaan (LI)

(72) Inventors: Benjamin Puchele, Roßhaupten (DE); Josef Schittl, Thueringen (AT); Michael Hinterstoisser, Emmering (DE); Martin Enzenhofer, Feldkirch (AT); Andres Hernandez Gonzalez, Marktoberdorf (DE); Franz Huber, Markt Wald/ Oberneufnach (DE); Markus Müller, Bürserberg (AT)

(73) Assignee: Hilti Aktiengesellschaft, Schaan (LI)

( * ) Notice: Subject to any disclaimer, the term of this patent is extended or adjusted under 35 U.S.C. 154(b) by 0 days.

(21) Appl. No.: 19/110,955

(22) PCT Filed: Sep. 26, 2023

(86) PCT No.: PCT/EP2023/076445
§ 371 (c)(1),
(2) Date: Mar. 12, 2025

(87) PCT Pub. No.: WO2024/074337
PCT Pub. Date: Apr. 11, 2024

(65) Prior Publication Data

US 2026/0084255 A1 Mar. 26, 2026

(30) Foreign Application Priority Data

Oct. 6, 2022 (EP) .................................... 22199952

(51) Int. Cl.
*B23Q 11/04* (2006.01)
*F16D 7/02* (2006.01)

(52) U.S. Cl.
CPC .............. *B23Q 11/04* (2013.01); *F16D 7/021* (2013.01); *F16D 7/028* (2013.01)

(58) Field of Classification Search
CPC .......... B23Q 11/04; F16D 7/021; F16D 7/028
See application file for complete search history.

(56) References Cited

U.S. PATENT DOCUMENTS

2016/0091029 A1 3/2016 Jansen et al.
2018/0128323 A1* 5/2018 Carlson ..................... F16D 7/10

FOREIGN PATENT DOCUMENTS

CN 203023323 U 6/2013
DE 29918121 U1 2/2000

(Continued)

*Primary Examiner* — Eyamindae C Jallow
(74) *Attorney, Agent, or Firm* — Davidson Kappel LLC

(57) ABSTRACT

A device for mechanical overload protection in a drive train of a machine tool, the drive train having an output side with an output shaft and an input side with a motor shaft. The output shaft is operatively connected to the motor shaft by way of a connector, the device for mechanical overload protection being formed by a press-fit connection between the connector-on the one side and the motor shaft or the output shaft on the other side. A method for producing such a device for mechanical overload protection in a machine tool is also provided. The peak torques in the drive train, which preferably occur for a short time, can be significantly reduced and the machine tool and its mechanical components can be protected from damage in the event of a blockage.

11 Claims, 6 Drawing Sheets

(56) References Cited

FOREIGN PATENT DOCUMENTS

| | | | | | |
|---|---|---|---|---|---|
| DE | 10311917 | A1 | | 3/2003 | |
| DE | 202006020408 | U1 | | 6/2008 | |
| DE | 102007039673 | B3 | * | 4/2009 | ............. F16D 1/097 |
| EP | 0642631 | B1 | * | 8/1996 | ........... F16D 43/286 |
| EP | 0856675 | A1 | * | 8/1998 | ........... F16D 1/0858 |
| WO | WO-2005040627 | A1 | * | 5/2005 | ............. F16D 7/021 |

* cited by examiner 22
40a
54, 58
42, 44
56

DEVICE FOR MECHANICAL OVERLOAD PROTECTION AND PRODUCTION PROCESS FOR SAME

BACKGROUND

In the field of machine tools, mechanical friction clutches are known in order to protect the machine tool and its components from high mechanical loads, for example if the tool of the machine tool blocks or jams in the substrate to be machined ("blockage event"). The protection that a mechanical friction clutch guarantees is based in particular on the fact that the drive train is mechanically separated if a blockage event occurs or if a blockage event is detected. With such mechanical friction clutches, on the one hand, the drive train of the machine tool can be protected from the high mechanical loads that occur in such a blockage event. On the other hand, the user of the machine tool can also be protected from possible injuries if the drive train is mechanically separated by the friction clutch in the event of a blockage.

SUMMARY OF THE INVENTION

However, in the course of technical refinements in the field of machine tools, there is an endeavour to no longer provide mechanical solutions for individual applications, but instead to use electronic and/or mechatronic solutions. For example, electronic friction clutch solutions are known in the prior art, as well as solutions for regulating the torque in the machine tool. Although these functions or solutions are able to protect the user from the effects that might occur in the event of a blockage, these electronic and/or mechatronic solutions are however frequently unable to limit the peak torques in the drive train of the machine tool, which often occur for a very short time. This inability is to be attributed in particular to the electronic and/or mechatronic solutions not being able to bring about any mechanical separation of the drive train in the way that is possible for example for a mechanical friction clutch.

Dealing with such short-term peak torques in the drive train when a mechanical friction clutch is to be dispensed with is a particular challenge for core drilling devices or other machine tools with torsion-resistant tools. For example, a drill bit is used as a tool on core drilling devices, wherein such drill bits comprise a hollow cylinder which can be used to cut out a cylindrical drilling core from a substrate which is to be machined. However, such drill bits are comparatively torsion resistant, so that the large forces that can occur if the tool of the machine tool blocks or jams in the substrate to be machined can only be absorbed by the drill bit to a small extent at best. The forces not absorbed by the drill bit are disadvantageously introduced into the drive train, where they can lead to damage to the machine tool or its components.

In order to avoid such damage, it has been proposed in the prior art to design the mechanics of the drive train of the machine tool to be particularly robust. This is intended to ensure that even very large peak torques or forces that can occur in the event of a blockage can be absorbed by the mechanics of the machine tool without causing damage to the machine tool or its components. However, it has been demonstrated that machine tools with such robust and therefore usually oversized mechanisms are very heavy. This can make the handling of such machine tools significantly more difficult, or the amount of time that a user can work with the machine tool is reduced.

It is an object of the present invention to overcome the shortcomings and disadvantages of the prior art described above and to provide a machine tool in which the effects of short-term peak torques occurring in the drive train can be reduced, especially in machine tools with torsion-resistant tools. Moreover, the machine tool to be provided should be configured to be particularly light and compact, so that the handling of the machine tool is made easier and the amount of time that a user can work with the machine tool can be extended. In particular, a machine tool should be provided, in the case of which, despite the presence of electronic and/or mechatronic functions, effective protection of the drive train of the machine tool from mechanical damage in the event of a blockage can be made possible.

According to the invention, a device for mechanical overload protection in a drive train of a machine tool is provided. The drive train has an output side with an output shaft and an input side with a motor shaft. The device for mechanical overload protection is preferably also referred to as "mechanical overload protection" in the context of the invention and is characterized in that the output shaft is operatively connected to the motor shaft by way of a connection means, the device for mechanical overload protection being provided by a press-fit connection between the connection means on the one side and the motor shaft or the output shaft on the other side. The connection means can preferably be a gear wheel or a bushing provided specifically for this. In the context of the invention, it is preferred that the output shaft can be driven by the motor shaft by way of a gear wheel, the device for mechanical overload protection in this design embodiment of the invention being formed by a press-fit connection between the gear wheel on the one side and the motor shaft or the output shaft on the other side. In the context of the invention, it may also be preferred for the mechanical overload protection not to have a gear wheel if the motor shaft and the output shaft are operatively connected to one another by way of a bushing as the connection means. The proposed device is advantageously configured to separate the drive train in the event of an overload or blockage. A so-called triggering torque of this mechanical overload protection is preferably designed so that the drive train of the machine tool is not separated during normal operation of the machine tool. In the context of the invention, it is preferred that the proposed mechanical overload protection only triggers in extremely severe blockage events in order to protect the machine tool and/or its components from damage. In particular, the invention can be used to reliably limit the torque in the drive train without the mechanical components of the machine tool having to be designed to be robust, large, heavy and possibly oversized. As a result, the invention can provide a particularly compact machine tool that fits easily in the hand and enables lengthy work with the machine tool. It was completely surprising that the proposed mechanical overload protection can be used in particular in machine tools with torsion-resistant tools. Tests have demonstrated that the proposed mechanical overload protection leads to a particularly good protective effect on core drilling devices which can be connected as a tool to a drill bit. Of course, the invention can also be used in other machine tools, such as screwdriving appliances or cordless screwdrivers.

The wording that the mechanical overload protection is formed on the one side by the output shaft or the motor shaft also includes the case in which more than these two shafts are provided in the transmission unit of the machine tool. For example, the machine tool can comprise layshafts with which the rotating movement or the torque of the motor shaft can be transmitted to the output shaft and which are preferably provided between the motor shaft and the output shaft. If the machine tool has such layshafts, it can also be preferred in the context of the invention that the press-fit connection of the mechanical overload protection is formed between the connection means on the one side and one of the shafts of the transmission unit of the machine tool on the other side. In other words, the press-fit connection of the mechanical overload protection can be formed between a bushing or a gear wheel as a connection means on the one side and the motor shaft, the output shaft or a layshaft on the other side.

With the invention, the peak torques in the drive train, which preferably occur for a short time, can be significantly reduced. The invention represents a mechanical device for separating the drive train of the machine tool in the event of a blockage, with the invention being able to provide effective protection of the drive train of the machine tool against mechanical damage in the event of a blockage despite the presence of electronic and/or mechatronic functions. In particular, the invention can be used to reduce the torque in the drive train, so that the mechanism of the machine tool can be effectively protected in the event of a blockage.

In the context of the invention, it is preferred that the output side of the drive train is oriented in the direction of a tool of the machine tool and the input side of the drive train is oriented in the direction of a motor of the machine tool (see also: FIG. 2). The output side of the drive train preferably represents a "slow" or "slow rotating" side of the drive train, while the input side of the drive train represents the "fast" or "fast rotating" side of the drive train. The fast side of the drive train is connected to the machine tool motor by way of the motor shaft while the slow side of the drive train is connected to the tool of the machine tool by way of the output shaft. The machine tool may be, for example, a core drilling device which has a drill bit as a tool. The fast side of the drive train can preferably also be referred to as the "motor side" of the drive train of the machine tool.

If the device for mechanical overload protection has a gear wheel as a connection means, it is preferred in the context of the invention that the device for mechanical overload protection can also have a coupling sleeve which is connected in a form-fitting manner to the gear wheel. In the context of the present invention, a press-fit connection can be produced in this way between the output shaft of the mechanical overload protection and a coupling sleeve. The coupling sleeve is connected in a form-fitting manner to the gear wheel. The gear wheel is therefore connected to the output shaft by way of the coupling sleeve, so that the output shaft rotates when the gear wheel connected thereto is driven externally. In the context of the present invention, this external drive takes place from the motor shaft of the drive train of the machine tool, which in turn is driven to a rotating movement by the motor of the machine tool. The motor shaft is driven to a rotating movement by the rotation of the motor of the machine tool. The pinions of the motor shaft engage in the intermediate spaces between the teeth of the gear wheel, so that the rotating movement of the motor shaft is transmitted to the gear wheel and the output shaft connected thereto.

Alternatively, there can be a press-fit connection of the mechanical overload protection between the motor shaft and the coupling sleeve, with the motor shaft being connected in a form-fitting manner to the gear wheel by way of the coupling sleeve. This allows rotation of the motor shaft to be transmitted to the output shaft by way of the gear wheel. If the mechanical overload protection comprises a bushing as a connection means, a press-fit connection can be formed between the bushing and the motor shaft or the output shaft in order to transmit the rotating movement of the motor shaft to the output shaft.

In a preferred embodiment of the invention, the device for mechanical overload protection can have a coupling sleeve which is connected in a form-fitting manner to the gear wheel, the output shaft being connected to the coupling sleeve by way of a press-fit connection. In this preferred embodiment of the invention, the mechanical overload protection is present on the output side of the drive train, with the output side of the drive train representing the more slowly rotating side of the drive train. In the context of the invention, this preferably means that the device is provided on the output side of the drive train, i.e. on the side that is oriented in the direction of the tool of the machine tool. In this way, a slip angle that is sufficient to limit the torque in the drive train can be made possible while at the same time placing low demands on the thermal stability and seizure behavior of the press-fit connection. With the invention, a particularly long-lasting overload protection can be provided in a machine tool, which can also be easily manufactured and integrated into the machine tool due to the comparatively large installation space available. The provision of the mechanical overload protection on the output side can be preferred because of the lower speeds that occur there and because of the larger installation space available.

The mechanical overload protection can also be disposed on the input side of the drive train. This is the case when the device for mechanical overload protection is formed by a press-fit connection between the connection means on the one side and the motor shaft on the other side. This design embodiment of the invention is particularly preferred when there is little space available on the output side.

In the context of the invention, it is preferred that the press-fit connection between the output or motor shaft of the proposed devices and the gear wheel or the coupling sleeve is designed such that the maximum torque to be expected in the drive train is reliably transmitted under normal operating conditions. Moreover, the proposed mechanical overload protection is configured to limit the torque M of the press-fit connection to be transmitted in the drive train to a value M_limit, where M_limit is smaller than the torque M_B, which occurs in the event of a blockage ("blocking torque"). As a result of this design of the device or the press-fit connection between the connection partners, effective protection of the machine tool or its components in the drive train can be achieved. In contrast to the mechanical friction clutch, the proposed mechanical overload protection is preferably not designed for continuous operation. Rather, in the context of the present invention, it is envisaged that the torque M in the drive train is limited by the invention only in the event of extreme overload or blockage. In the context of the invention, it is preferred that the proposed mechanical overload protection slips in the event of a blockage, so that the torque in the drive train is limited.

In the context of the invention, it is preferred that the press-fit connection comprises a first and a second sliding partner, the first sliding partner being a constituent part of the output shaft or the motor shaft and comprising a first sliding surface, and the second sliding partner being a constituent part of the gear wheel or the coupling sleeve and comprising a second sliding surface, preferably at least one of the friction surfaces potentially having a surface coating. Preferably, the surface coating can be selected from a group comprising: hard chrome plating, nitration, additional phosphating and/or nitrocarburizing, without being limited thereto. A molybdenum coating can particularly preferably be used between the gear wheel and a shaft of the power train of the machine tool in order to ensure optimal adhesion or friction between the sliding partners. With the molybdenum coating, "seizing" between the sliding partners can be effectively reduced or avoided. Moreover, further slippage in the sliding partners of the press-fit connection can be avoided, so that the machine tool, or the motor thereof, respectively, can advantageously be brought to stop within milliseconds. It was completely surprising that such a rapid deceleration of the machine tool, or the motor thereof, respectively, can be made possible, while at the same time providing a compact design of the machine tool. In this way, significantly faster braking times can be achieved by the invention in comparison to clutches using bronze disks, as are used in conventional machine tools in the prior art. The molybdenum coating is illustrated in FIG. 5, for example, whereby the molybdenum coating in the preferred design embodiment of the invention illustrated in FIG. 5 is at least in part present between the gear wheel and the output shaft.

The first and second sliding partners can preferably also be referred to as "friction partners" in the context of the invention, with the sliding or friction partners forming a sliding or friction pair. The sliding or friction pair preferably has a suitable material pairing, whereby the individual sliding or friction partners can preferably comprise tool steel, sintered material, case-hardened steel and/or tempered steel to form the press-fit connection. In principle, the use of a multiplicity of metals or metal alloys as sliding or friction partners is conceivable in the context of the present invention. In the context of the invention, it is preferred that the materials can comprise metals or metal alloys from different primary forming processes.

In the context of the invention, it is preferred that the first sliding surface of the first sliding partner is disposed on an external side of the output shaft, while the second sliding surface of the second sliding partner is disposed on an internal side of the coupling sleeve, so that the sliding or friction surfaces are disposed so as to be opposite or in contact with one another.

By selecting a suitable material for the first and second sliding or friction partners, which conjointly form the press-fit connection between the output shaft and the coupling sleeve, slipping of the proposed mechanical overload protection can be promoted, as a result of which the drive train is separated in the event of a blockage and the torque transmitted in the drive train can be limited. In this way, the machine tool and its mechanical components can be effectively protected from damage in the event of a blockage.

In the context of the invention, it is preferred that a material of the coupling sleeve is selected from a group comprising: steel, brass, bronze, ceramic. The coupling sleeve is preferably configured as a bushing or may have the shape of a bushing.

Due to the production process, the triggering range of the mechanical overload protection may scatter undesirably wide. This undesirably wide scatter of the triggering range of the proposed device is due in particular to production-related tolerances. The undesirable, wide scatter of the triggering range can be reduced by virtue of the press-fit connection having an external surface, onto which a clamping ring can be pressed. This allows the triggering range of the mechanical overload protection to be adjusted and the wide scatter of the triggering range due to production-related tolerances to be reduced. In the context of the invention, it is preferred that the clamping ring is pressed on in a force and/or path-controlled manner. In addition, the external surface can comprise a cone angle. In other words, as a remedial measure against production-related tolerances, an external clamping ring can be pressed on in a preferably force-controlled manner, whereby the clamping ring can be pressed onto an external, preferably flat cone angle of the press-fit connection.

In the context of the invention, it is preferred that the clamping ring is designed as a conical ring which is pressed onto the external surface of the press-fit connection in a force-controlled manner and in this way limits the triggering range of the mechanical overload protection. Alternatively or additionally, it may be preferred in the context of the invention that the clamping ring is pressed onto the external surface of the press-fit connection in a path-controlled manner, so that the triggering range of the mechanical overload protection is advantageously limited in this way. In that respect, an external surface of the bushing is preferably also conical. In particular, the invention can achieve a very small variance when triggering the mechanical overload protection. This very small variance when triggering the mechanical overload protection can advantageously be achieved in that the torque to be transmitted and/or a desired triggering value of the mechanical overload protection can be set with a very small variance during the press-fitting process. During the press-fitting process, a force F is exerted on the preferably conical clamping ring. This press-fitting process can be carried out with a defined force F and/or along a defined path S. For example, a hydraulic press can be used in the process. The higher this force F exerted on the clamping ring, the greater the torque M that can later be transmitted with the resulting press-fit connection of a shaft of the transmission unit of the machine tool on the one side and a gear wheel and/or coupling sleeve on the other side. In the context of the invention, the term "force-controlled" preferably means that the clamping ring is pushed axially onto the outer conical region of the bushing up to a defined press-fitting force. In the context of the invention, the term "path-controlled" preferably means that the clamping ring is preferably pushed axially onto the outer conical region of the bushing for a defined path. The clamping region is preferably disposed directly above the contact region of the shafts and the coupling sleeve. Since the cone angle on the external side of the bushing is known, the radial preload of the connection between the output or motor shaft and the coupling sleeve can be adjusted in this way with the help of the applied press-fitting force or the defined displacement path. The clamping ring can be pushed over a cone so that the press fit, which forms the connection between the shaft and the clamping ring, can advantageously be enlarged. Preferably, the clamping ring is pushed onto the shaft with a defined press-fitting force and/or for a specific path length and is thereby fastened to the shaft. The cone advantageously has an inclined surface, the inclination of which is determined by the cone angle (cf. FIG. 6).

In a second aspect, the invention relates to a method for producing a mechanical overload protection. The terms, definitions and technical advantages introduced for the mechanical overload protection preferably apply analogously to the production process. The production process is characterized by the following method steps:

a) producing a press-fit connection between the output shaft or the motor shaft on the one side and the coupling sleeve of the device on the other side;
b) detecting the press-fitting force required to produce the press-fit connection;
c) determining the triggering torque of the device;

d) calculating a press-fitting force and/or a displacement path for the clamping ring;

e) press-fitting the clamping ring onto the press-fit connection between the output shaft or the motor shaft and the coupling sleeve of the device using the previously calculated press-fitting force and/or the previously calculated displacement path;

f) re-determining the triggering torque of the device.

In the context of the invention, it is preferred that the proposed production method in particular produces the press-fit connection between the output shaft or the motor shaft of the drive train and the coupling sleeve. As a result, in the context of the proposed production method, in particular the gear wheel, which can be driven by the motor shaft of the machine tool, is connected to the output shaft or the motor shaft by way of the coupling sleeve. Preferably, in the context of the proposed production method, the gear wheel is pressed onto the output shaft or the motor shaft, with the coupling sleeve being able to be inserted between the gear wheel and the output shaft or the motor shaft. The press-fitting force required to produce the press-fit connection is measured in the process, this press-fitting force required to produce the press-fit connection being preferably referred to as the "first press-fitting force" in the context of the present invention. The first press-fitting force can preferably be measured using a servo press. For example, forces of up to 30 kilonewtons (kN) can be used, with a measurement accuracy when determining the first press-fitting force being, for example, 1% of the force applied.

The triggering torque of the resulting press-fit connection is then checked by determining the triggering torque of the mechanical overload protection. In the context of the invention, this method step is preferably also referred to as "checking" the triggering torque of the mechanical overload protection. The triggering torque can be checked, for example, with the aid of a torque measuring shaft, the torque measuring shaft preferably being configured to determine a triggering torque.

The press-fitting force and/or the displacement path for the clamping ring can then be calculated, the press-fitting force and/or the displacement path required for press-fitting the clamping ring on being preferably referred to as the "second press-fitting force" and/or as the "second displacement path" in the context of the invention. With the help of a software solution or a computer program product, a fictitious contact force or a fictitious displacement path can be calculated, which can then be used to press-fit the clamping ring. The clamping ring is then pressed onto the press-fit connection between the output shaft and the coupling sleeve of the mechanical overload protection using the previously calculated press-fitting force and/or the previously calculated displacement path.

The triggering torque of the mechanical overload protection is then "checked" again to check whether any variances in the triggering torque and/or tolerances have been reduced. If, for example, during the renewed "checking" of the triggering torque it is determined that the triggering torque is too low, the clamping ring can be pressed on again with a greater press-fitting force in order to increase the triggering torque of the mechanical overload protection. The altered triggering torque can then be measured or checked again. The last-mentioned steps can be repeated until a desired triggering torque and/or minimal variances in the triggering torque are achieved.

Advantageously, the proposed method can be used to provide an effective device for mechanical overload protection in a drive train of a machine tool, which has particularly small variances in the triggering torque in the event of a blockage.

In one exemplary embodiment, the invention relates to a device for mechanical overload protection in a drive train of a machine tool, wherein the output shaft can be driven by the motor shaft by way of a gear wheel, and the gear wheel can be pressed directly onto the output shaft. In this scenario, the component pair consisting of the output shaft and gear wheel forms a mechanical overload protection. The connection between the output shaft and the gear wheel can preferably be produced by way of a press-fit connection, with the mechanical overload protection then preferably being integrated directly in the press-fit connection between the gear wheel and the shaft. The coupling sleeve can be omitted in this design embodiment of the invention, thereby reducing the complexity of the device and simplifying its manufacture.

In a further exemplary embodiment of the invention, the device for mechanical overload protection can be disposed on the input side of the drive train. The mechanical overload protection can then be formed by the component pair of motor shaft and gear wheel, whereby a coupling sleeve may or may not be used between the motor shaft and the gear wheel. If a coupling sleeve is used, it is preferred in the context of the invention that the coupling sleeve is connected in a form-fitting manner to the gear wheel, and the motor shaft is connected to the coupling sleeve by way of a press-fit connection. The provision of the mechanical overload protection on the input side of the drive train can be preferred above all if integration on the output side is not possible, for example because there is insufficient installation space on the output side.

In a further exemplary embodiment of the invention, the output shaft can be driven by the motor shaft by way of a gear wheel, the device for mechanical overload protection having a coupling sleeve which is connected in a form-fitting manner to the gear wheel, the output shaft being connected to the coupling sleeve by way of a press-fit connection.

BRIEF DESCRIPTION OF THE DRAWINGS

Further advantages are derived from the following description of the figures. The figures, the description and the claims contain numerous features in combination. The person skilled in the art will also expediently consider the features individually and combine them into further expedient combinations.

In the figures, identical and similar components are denoted with the same reference numerals.

In the Figures:

FIG. 1 shows a view of a preferred design embodiment of the device for mechanical overload protection;

FIG. 2 shows a lateral view of a preferred design embodiment of the device for mechanical overload protection;

FIG. 3 shows a detailed view of a preferred design embodiment of the device for mechanical overload protection;

FIG. 4 shows a view of a preferred design embodiment of the device for mechanical overload protection with a clamping ring;

FIG. 5 shows a view of a preferred design embodiment of the device for mechanical overload protection with a clamping ring to illustrate the disposal of the molybdenum coating;

FIG. 6 shows a view of a preferred design embodiment of the device for mechanical overload protection with a clamping ring to illustrate the cone angle.

DETAILED DESCRIPTION

Figure 1:
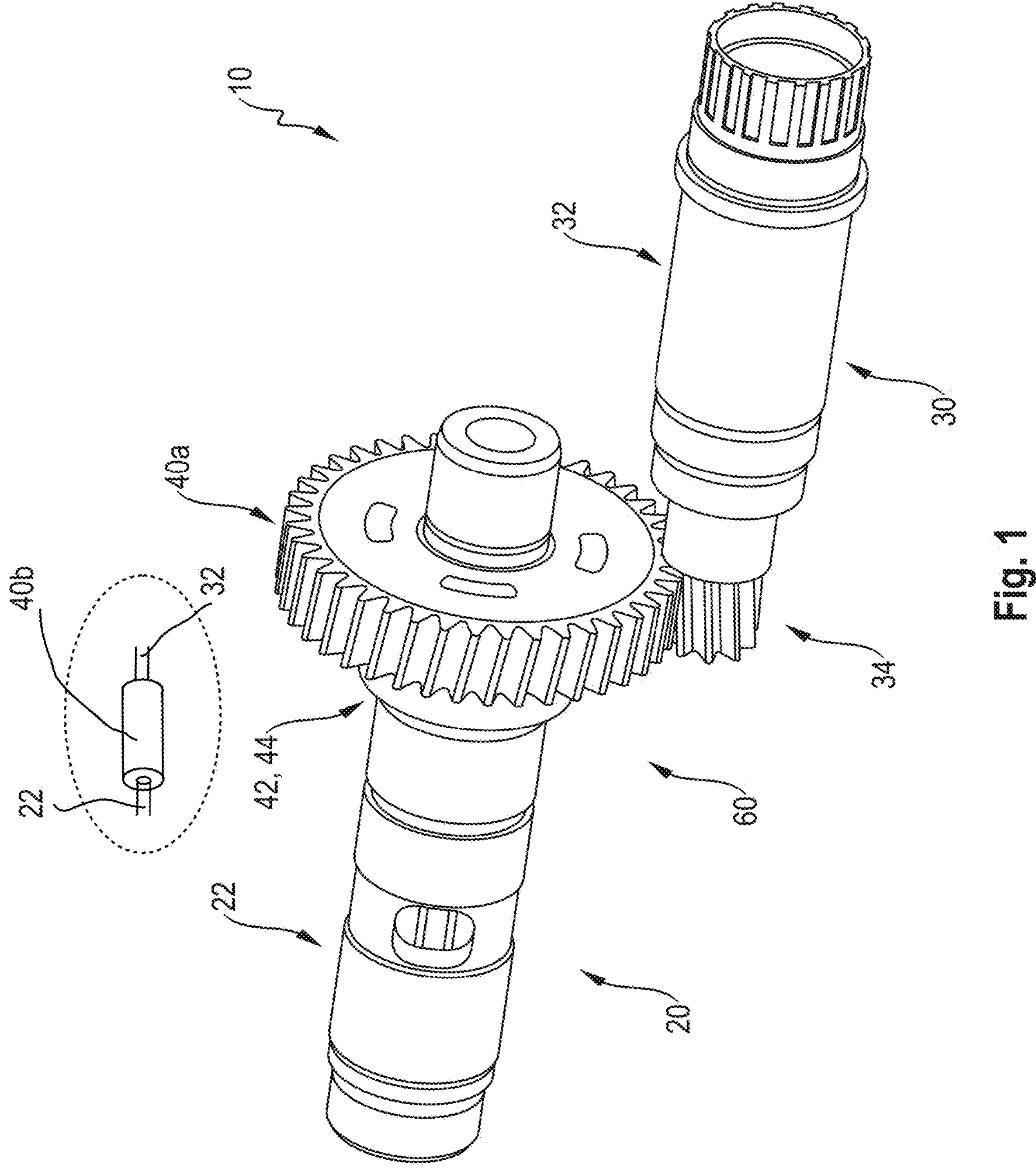

FIG. 1 shows a preferred design embodiment of the device 10 for mechanical overload protection. Illustrated in particular is a mechanical overload protection 10, which is disposed on the output side 20 of the drive train. To be seen in particular in FIG. 1 are the output side 20 and the input side 30 of the drive train (without reference signs) of a machine tool. The output side 20 of the drive train has an output shaft 22, which can be connected by way of a gear wheel 40*a* to a motor shaft 32 of the input side 30 of the drive train. For this purpose, the motor shaft 32 can have a pinion 34 on the side facing away from the motor, which pinion 34 can engage with the teeth of the gear wheel 40*a*. In this way, a rotating movement of the motor shaft 32 on the input side 30 of the drive train is transmitted to the output side 20 and the output shaft 22. The gear wheel 40*a* can be considered to be a connection means 40 for connecting the motor shaft 32 and the output shaft 22. Alternatively, a bushing 40*b* (not illustrated solely schematically as an alternative) may be used to transmit the rotating movement and/or the torque of the motor shaft 32 to the output shaft 22. The mechanical unit for transmitting the rotating movement and/or the torque of the motor 14 of the machine tool to the tool holder 12 is preferably referred to as the "transmission unit 60" in the context of the invention. The transmission unit 60 of the machine tool preferably includes the motor shaft 32, the output shaft 22, as well as any layshafts, as well as the device 10 for mechanical overload protection and its connection means 40, such as gear wheels 40*a* or bushings 40*b*. The figures particularly illustrate the design embodiment of the invention in which the connection means 40 is configured as a gear wheel 40*a*. The transmission unit 60 of the machine tool illustrated in the figures includes in particular a motor shaft 32 and an output shaft 22. The proposed device 10 for mechanical overload protection can in particular also include layshafts which, besides the motor shaft 32 and the output shaft 22, are used to transmit the rotating movement and/or the torque of the motor 14 to the tool of the machine tool.

The motor shaft 32 can, for example, have a number of Z=11 teeth. The gear wheel 40*a* can, for example, have a number of Z=58 teeth. Of course, other combinations of numbers of teeth are also conceivable. The mentioned combination of eleven teeth on the motor shaft 32 and fifty-eight teeth on the gear wheel 40*a* of the proposed overload protection 10 has proven to be particularly suitable for transmitting the torques that occur, but also for enabling the drive train to be separated in the event of a blockage. As a result of the rotation of the motor 14 (see FIG. 2) of the machine tool, the motor shaft 32 is driven to a rotating movement. The teeth 34 of the motor shaft 32 engage in the intermediate spaces between the teeth of the gear wheel 40*a*, so that the rotating movement of the motor shaft 32 is transmitted to the gear wheel 40*a* and the output shaft 22 connected thereto.

The gear wheel 40*a* is connected in a form-fitting manner to a coupling sleeve 42, which in turn is connected to the output shaft 22 using a press-fit connection 44. In this way, the gear wheel 40*a* is connected to the output shaft 22, so that a rotating movement of the gear wheel 40*a* also leads to a rotating movement of the output shaft 22 on the output side 20 of the drive train.

Figure 2:
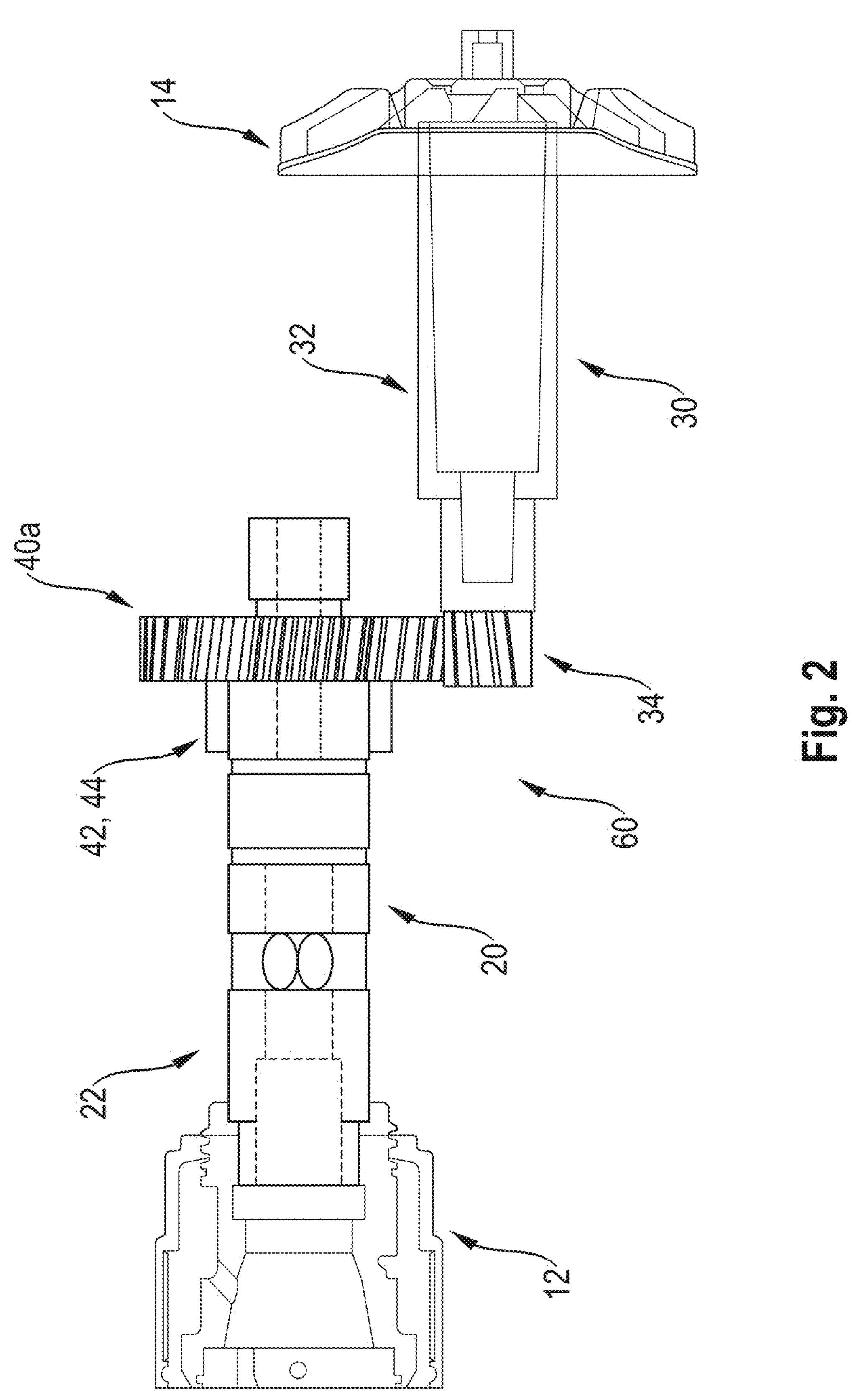

FIG. 2 shows a side view of a preferred design embodiment of the device 10 for mechanical overload protection 10, this mechanical overload protection also being disposed on the output side 20 of the drive train. A possible disposing of the drive train within the machine tool is also shown in FIG. 2. On the left side of FIG. 2, a holder 12 for a tool of the machine tool is indicated. The machine tool can be, for example, a core drilling device. The tool of the machine tool can, for example, be formed by a drill bit, with a drill bit representing a comparatively torsion-resistant tool. The tool holder 12 is preferably disposed at a first end of the output shaft 22 of the drive train, while the second end of the output shaft 22 forms an end of the output shaft 22 facing away from the tool holder. At this end facing away from the tool holder, the output shaft 22 is connected to a coupling sleeve 42, the connection being formed by a press-fit connection 44. In other words, there is a press-fit connection 44 between the output shaft 22 and the coupling sleeve 42. The coupling sleeve 42 is moreover connected in a form-fitting manner to a gear wheel 40*a*, which can be driven by way of a motor shaft 32 of the input side 30 of the drive train. The motor shaft 32 has a pinion 34 at its first end, which can interact with the gear wheel 40*a* in order to transmit a rotating movement. At its second end, the motor shaft 32 is connected to the motor 14 of the machine tool. Due to the rotating speed of the motor 14 of the machine tool, the input side 30 with the motor shaft 32 represents the fast-rotating side of the drive train, while the output side 20 with the output shaft 22 represents the slow-rotating side of the drive train.

Figure 3:
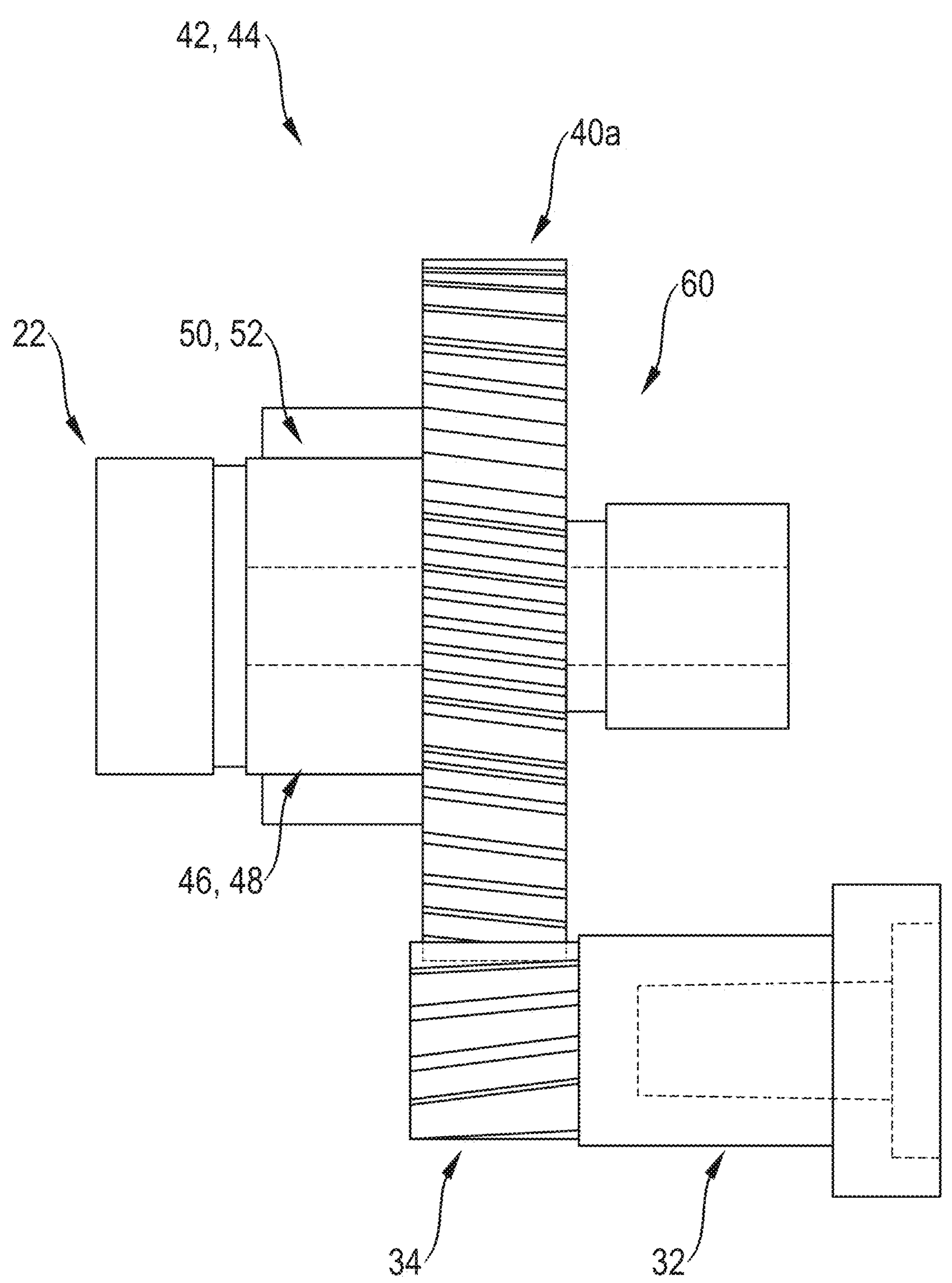

FIG. 3 shows a detailed view of a preferred design embodiment of the device 10 for mechanical overload protection. The press-fit connection 44 between the output shaft 22 and the coupling sleeve 42 allows the output shaft 22 and the coupling sleeve 42 to slide or rub against each other.

In this sense, the output shaft 22 and the coupling sleeve 42 represent friction or sliding partners in a friction or sliding pair. In particular, the output shaft 22 represents a first sliding partner 46, and the output shaft 22 has a first friction or sliding surface 48. The coupling sleeve 42 represents a second sliding partner 50, and the coupling sleeve 42 has a second friction or sliding surface 52. The sliding or friction surfaces 48, 52 form contact surfaces between the output shaft 22 and the coupling sleeve 42, whereby at least one of the sliding or friction surfaces 48, 52 can have a surface coating. The provision of a surface coating represents a measure to guarantee a permanent, substantially consistent, triggering torque for a separation of the drive train in the event of the machine tool becoming blocked. The sliding or friction surfaces 48, 52 can, for example, be hard chrome-plated and/or nitration-treated and/or have a molybdenum coating, without being limited to this. Another measure to ensure a permanent, substantially consistent, triggering torque for a separation of the drive train in the event of a blockage of the machine tool lies in selecting suitable materials for the sliding or friction surfaces 48, 52 of the sliding partners 46, 50. For example, tool steel or sintered materials can be used. The coupling sleeve 42, which is preferably pressed between the gear wheel 40*a* and the output shaft 22, can comprise, for example, steel, brass, bronze and/or ceramic, or can be made from at least one of the materials mentioned. Of course, material combinations or alloys are also conceivable for producing the sliding partners 46, 50 or the coupling sleeve 42.

Preferably, the materials of the sliding partners 46, 50 or the coupling sleeve 42 are selected so that the mechanical overload protection 10 is triggered, i.e. separates the drive train, particularly in severe blockage events. In this way, the torque in the drive train can be limited and the components of the machine tool are effectively protected from damage in the event of a blockage. A fundamental concept on which the invention is based is to limit the torque to be transmitted of the press-fit connection 44 to a value M_limit that is smaller than the maximum blocking torque M_B. The materials of the sliding partners 46, 50 and the coupling sleeve 42 are in particular selected or designed so that the resulting press-fit connection 44 slips in the event of a blockage and in this way limits the torque in the drive train.

Figure 4:
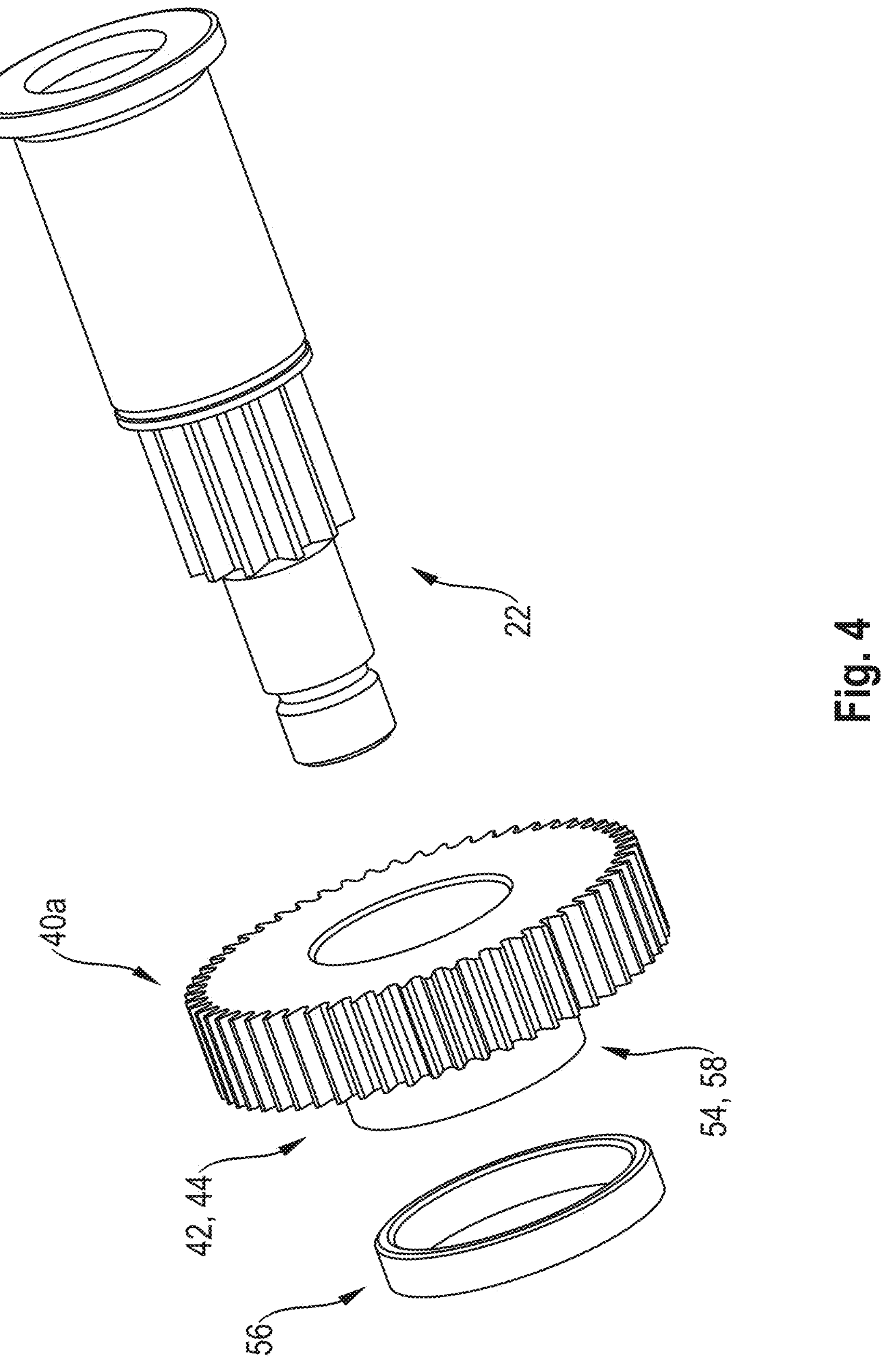

FIG. 4 shows a view of a preferred design embodiment of the device 10 for mechanical overload protection with the clamping ring 56. The provision of an additional clamping ring 56 in the region of the press-fit connection 44 can reduce production-related tolerances of the mechanical overload protection 10, so that the triggering torque of the mechanical overload protection 10 can be adjusted and checked more precisely by the clamping ring 56. The clamping ring 56 is pressed in particular onto an external surface 54 of the press-fit connection 44, with the clamping ring 56 being pressed on in particular in a force-controlled manner. After press-fitting the clamping ring 56, the triggering moment of the mechanical overload protection 10 can be re-measured and, if necessary, the clamping ring 56 can be pressed onto the press-fit connection 44 from the outside in a second or further press-fitting step, i.e. using a higher press-fitting force. The external surface 54 can be formed, for example, by an external surface of the coupling sleeve 42.

The press-fit connection 44 preferably has a preferably small cone angle 58 onto which the clamping ring 56 can be pressed. In other words, the coupling sleeve 42 may not be completely cylindrical, but rather tapered, so that the coupling sleeve 42 forms a slightly slanting hollow cylinder.

The slope of the walls of this hollow cylinder are determined by the cone angle 58, wherein the cone angle 58 can be in a range of 1 to 5 degrees, preferably 3 degrees. The cone angle 58 is also illustrated in particular in FIG. 6. The cone angle 58 can also be larger or smaller than the angle range mentioned, depending on whether a coating of the friction partners is used or not, or depending on the quality or chemical composition of any coating.

In the context of the invention, it is preferred that the clamping ring 56 is formed by a conical ring, which can be pressed onto the press-fit connection 44 in a force-controlled and/or path-controlled manner in order to better and more precisely be able to adjust its triggering torque as an optimal, additional component of the mechanical overload protection 10. In the context of the invention, the triggering torque represents the torque at which the mechanical overload protection 10 separates the drive train if, for example, the tool of the machine tool is blocked or if the tool of the machine tool is jammed in the substrate to be machined. By separating the drive train by the mechanical overload protection 10 in this so-called blockage event, the torque in the drive train can be reliably limited, so that the components of the machine tool are protected from damage. Specially defined and set torque limits at which the mechanical overload protection 10 is triggered ("triggering torque") help with this. Such clearly defined torque limits can be provided in particular with the aid of the clamping ring 56 pressed on in a force-controlled manner. The clamping ring 56 can be pressed onto an external surface 54 of the press-fit connection 44 using an automated assembly process, with torques and forces being measured as part of the assembly process in order to determine an optimal press-fitting force and/or an optimal path for press-fitting the clamping ring 56 onto the press-fit connection 44. In this way, the triggering torque or its accuracy can be improved and advantageously adjusted in a particularly fine manner.

Figure 5:
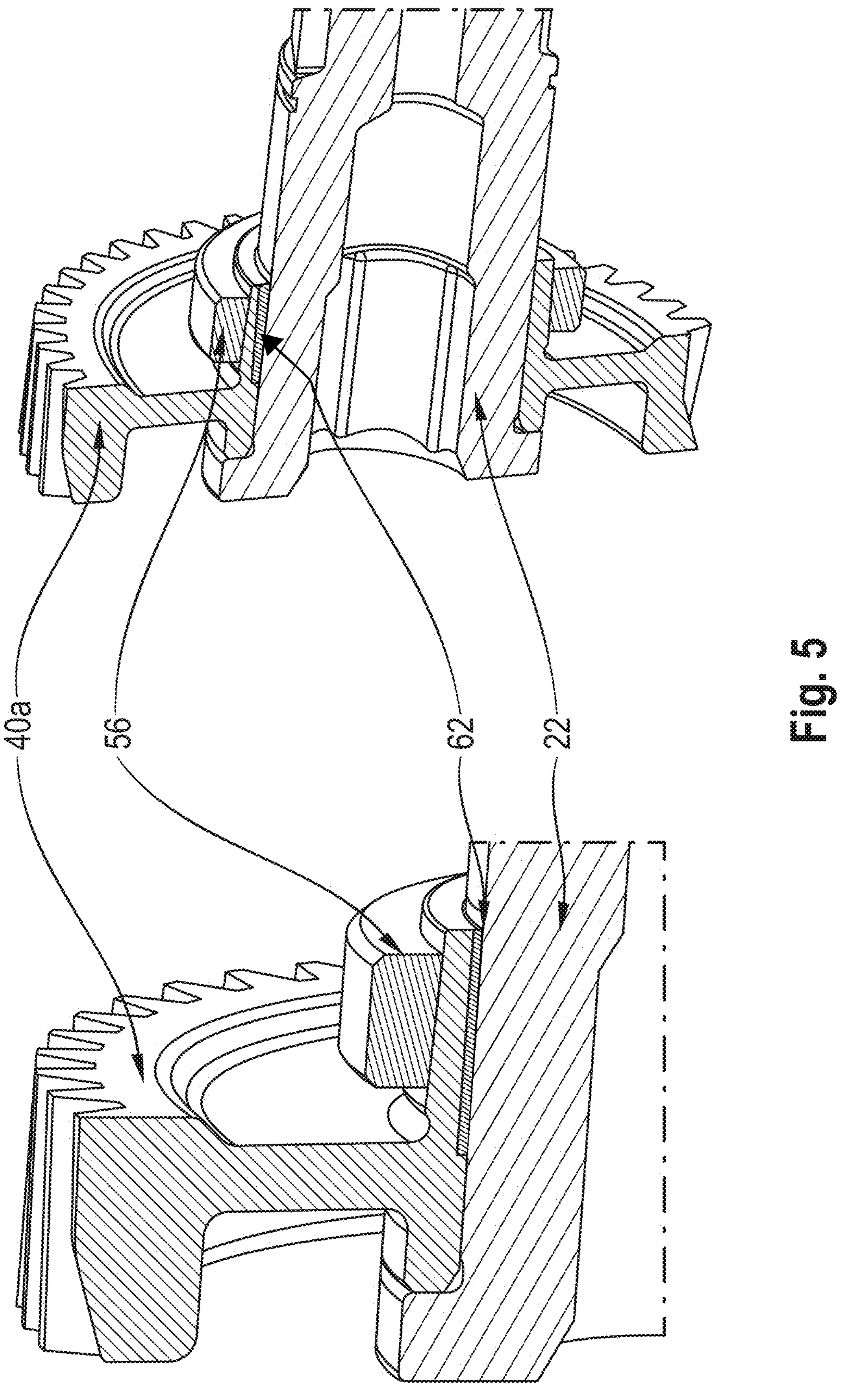
Figure 8:
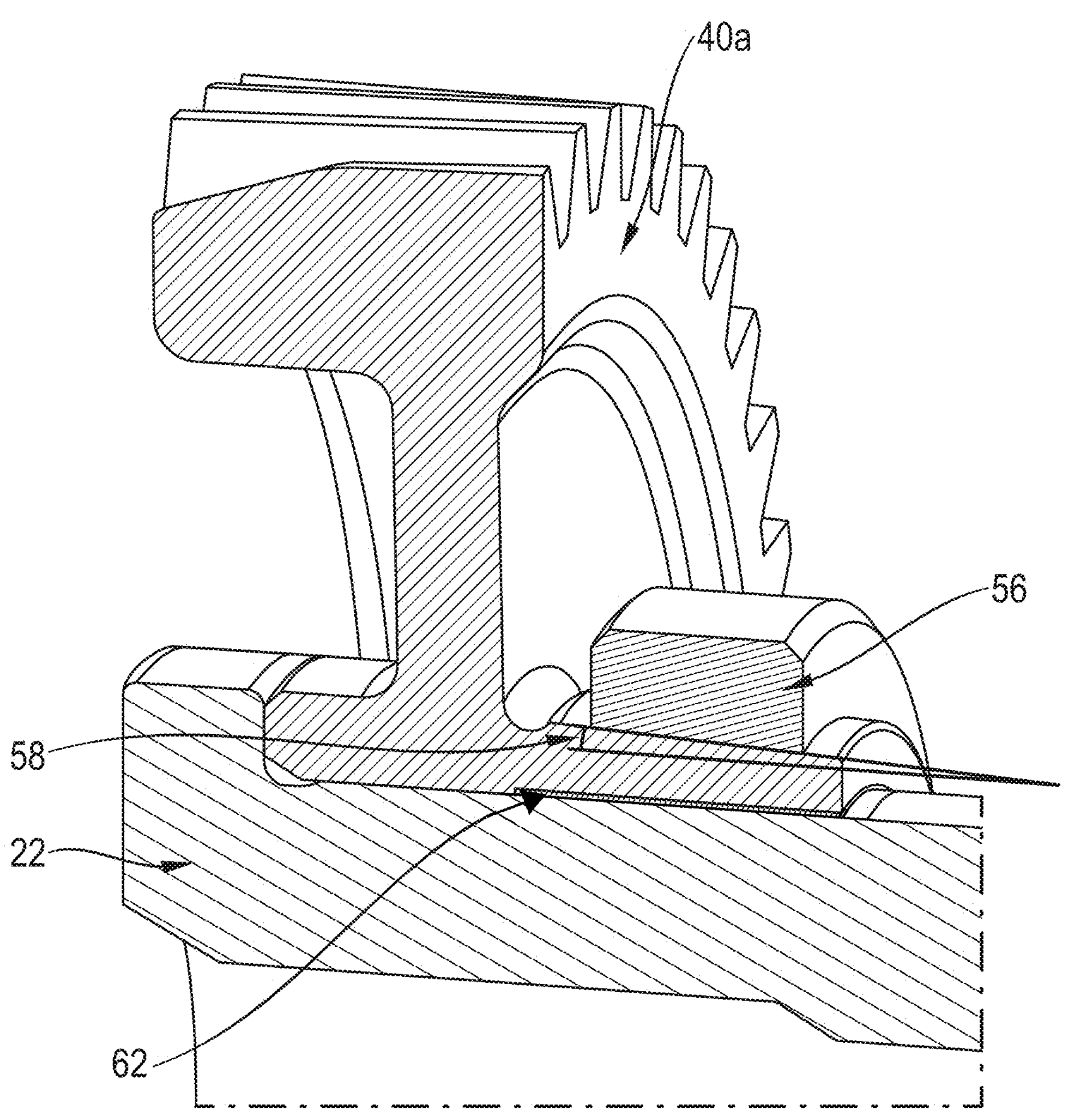

FIG. 5 shows a preferred design embodiment of the device 10 for mechanical overload protection with a clamping ring 56 to illustrate the disposal of the molybdenum coating 62. The molybdenum coating 62 in the exemplary embodiment of the invention illustrated in FIG. 5 is disposed between the gear wheel 40*a* and the output shaft 22.

FIG. 6 shows a further preferred design embodiment of the device 10 for mechanical overload protection with a clamping ring 56, with the cone angle 58 and its position being shown in particular in FIG. 6.

LIST OF REFERENCE SIGNS

10 Device for mechanical overload protection
12 Tool holder
14 Motor
20 Output side
22 Output shaft
30 Input side
32 Motor shaft
34 Teeth
40 Connection means
40*a* Gear wheel
40 Bushing
42 Coupling sleeve
44 Press-fit connection
46 First sliding partner
48 First sliding surface
50 Second sliding partner
52 Second sliding surface
54 External surface
56 Clamping ring
58 Cone angle
60 Transmission unit
62 Molybdenum coating

What is claimed is:

1. A device for mechanical overload protection in a drive train of a machine tool, the drive train having an output side with an output shaft and an input side with a motor shaft, the device comprising:

a connector operatively connecting the output shaft to the motor shaft, a press-fit connection between the connector on one side and the motor shaft or the output shaft on an other side, and a coupling sleeve connected in a form-fitting manner to the connector.

2. The device as recited in claim 1 wherein the connector is a gear wheel or a bushing.

3. The device as recited in claim 2 wherein the press-fit connection includes a first sliding partner and a second sliding partner, the first sliding partner being a constituent part of the output shaft or the motor shaft and having a first sliding surface, and the second sliding partner being a constituent part of the gear wheel or a coupling sleeve connected to the connector and having a second sliding surface, at least one of the first and second sliding surfaces having a surface coating.

4. The device as recited in claim 3 wherein the surface coating is selected from a group consisting of: hard chrome plating, nitration, molybdenum coating, additional phosphating and nitrocarburizing.

5. The device as recited in claim 1 wherein a material of the coupling sleeve is selected from a group consisting of: steel, brass, bronze and ceramic.

6. The device as recited in claim 1 wherein the device is configured to limit a torque of the press-fit connection to be transmitted in the drive train to a value M_limit, where M_limit is smaller than a further torque occurring in the event of a blockage.

7. The device as recited in claim 1 wherein the coupling sleeve has an external surface, the device further comprising a clamping ring pressable onto the external surface in order to set a triggering range of the device.

8. The device as recited in claim 7 wherein the clamping ring is pressable on in a force-controlled or path-controlled manner.

9. The device as recited in claim 7 wherein the external surface has a cone angle.

10. A method for producing the device as recited in claim 1, the method comprising the following steps:

a) producing the press-fit connection between the output shaft or the motor shaft on the one side and the coupling sleeve on the other side;

b) detecting a press-fitting force required to produce the press-fit connection;

c) determining a triggering torque of the device;

d) calculating a press-fitting force or a displacement path for a clamping ring;

e) press-fitting the clamping ring onto the press-fit connection between the output shaft or the motor shaft and the coupling sleeve of the device using the previously calculated press-fitting force or using the previously calculated displacement path; and f) re-determining the triggering torque of the device.

11. A method for producing a device for mechanical overload protection in a drive train of a machine tool, the drive train having an output side with an output shaft and an input side with a motor shaft, the device comprising:

a connector operatively connecting the output shaft to the motor shaft, and a press-fit connection between the connector on one side and the motor shaft or the output shaft on an other side, the method comprising the following steps:

a) producing the press-fit connection between the output shaft or the motor shaft on the one side and the coupling sleeve on the other side;

b) detecting a press-fitting force required to produce the press-fit connection;

c) determining a triggering torque of the device;

d) calculating a press-fitting force or a displacement path for a clamping ring;

e) press-fitting the clamping ring onto the press-fit connection between the output shaft or the motor shaft and the coupling sleeve of the device using the previously calculated press-fitting force or using the previously calculated displacement path; and f) re-determining the triggering torque of the device.

* * * * *